Figure 1:
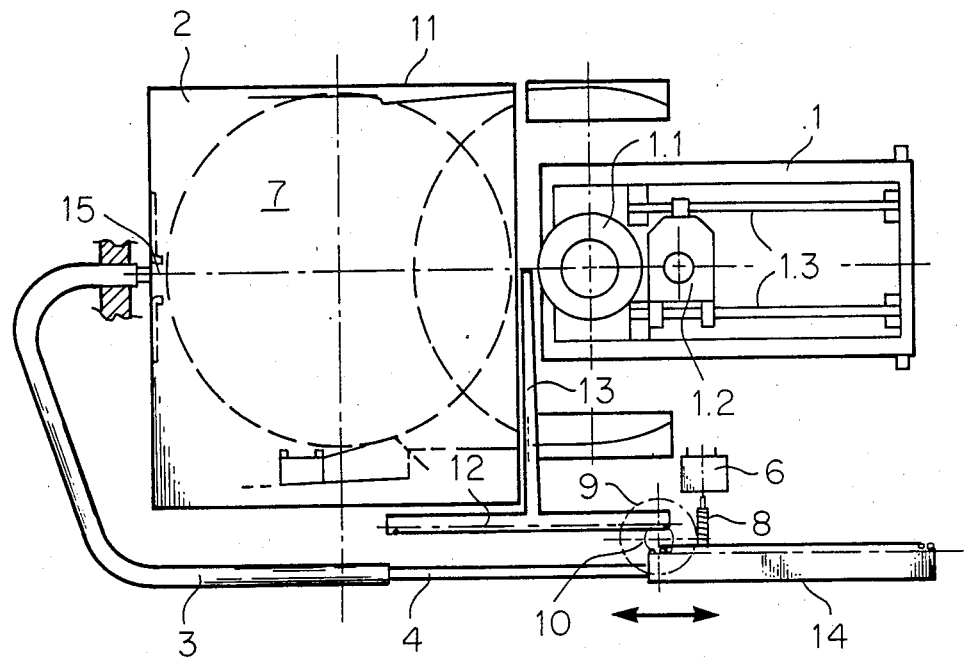

United States Patent [19]

Laufer

[11] Patent Number: 4,811,318

[45] Date of Patent: Mar. 7, 1989

[54] DISK PLAYER WITH MAGAZINE

[75] Inventor: Helmut Laufer, St. Georgen, Fed. Rep. of Germany

[73] Assignee: Deutsche Thomson-Brandt GmbH, Villingen, Fed. Rep. of Germany

[21] Appl. No.: 119,848

[22] Filed: Nov. 12, 1987

[30] Foreign Application Priority Data

Nov. 14, 1986 [DE] Fed. Rep. of Germany ....... 3638910

[51] Int. Cl.$^4$ ...................... G11B 17/04; G11B 17/26
[52] U.S. Cl. ......................................... 369/36; 369/204
[58] Field of Search ....................... 369/34, 36, 37, 38, 369/39, 205, 231, 204

[56] References Cited

U.S. PATENT DOCUMENTS

| | | | |
|---|---|---|---|
| 1,477,944 | 12/1923 | DeVere | 369/39 |
| 2,395,026 | 2/1946 | Weaver | 369/205 |
| 2,616,706 | 11/1952 | Maurer | 369/36 |
| 2,891,797 | 6/1959 | Hull et al. | 369/38 |
| 4,653,037 | 3/1987 | Nakayama et al. | 369/38 |

Primary Examiner—Steven L. Stephan
Attorney, Agent, or Firm—Max Fogiel

[57] ABSTRACT

1. Disk player with a magazine 2.1. A known compact-disk player with a magazine consisting of several superimposed compartments for accommodating compact disks has a system of levers and a pulley driven by an electric motor in each compartment for removing a disk from the compartment.

2.2. To decrease the considerable expense for each compartment (2) in the magazine (11), there is an access opening (15) on the rear wall of each compartment, through which a plunger (4) can travel to thrust the compact disk (7) out of the compartment. The plunger can be a flexible shaft that extends forward from the rear wall of the magazine through a tubular guide (3) and along one side of the magazine. The plunger can be introduced into and extracted from the compartment by means of a toothed rack (14) secured to the front of the flexible plunger (4) in conjunction with the cogwheel (10) that is driven by an electric motor (6) and engages the rack.

2.3. When embodied in a compact-disk player the invention is especially appropriate for installation in a motor vehicle.

Figure 2:
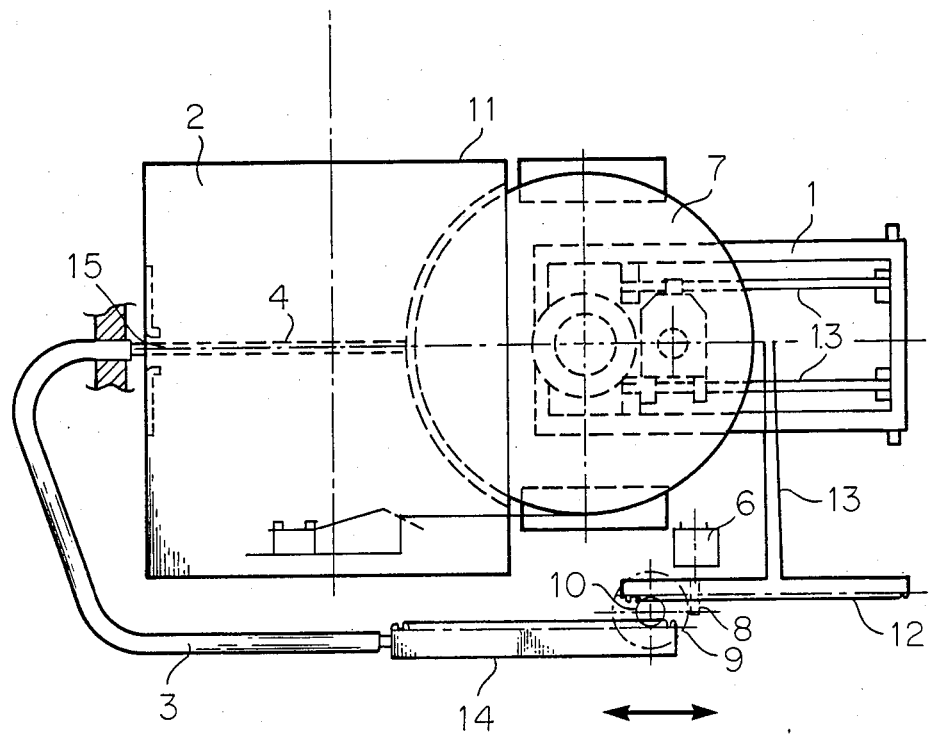

2.3. Figures 1 and 2.

12 Claims, 3 Drawing Sheets

DISK PLAYER WITH MAGAZINE

The invention concerns a disk player with a magazine consisting of several superimposed compartments for accommodating disk-shaped recording media and with an operating mechanism, whereby the magazine and the operating mechanism can be shifted toward each other for the purpose of removing the disk-shaped recording media.

Compact-disk players, video-disk players, and computers that operate with video disks as information-storage devices for example exist in the form of disk players of this type with a magazine that accomodates several disks.

Belgian Patent Application BE No. 901 937 describes a compact-disk player with a magazine that has a system of levers and a pulley, driven by an electric motor in each compartment for removing a disk from the compartment. The pulley contacts the disk at its circumference and rolls it out of the compartment.

This design is relatively expensive not only in itself, but, since the complicated assembly of levers, pulley, and motor must be installed in each compartment, considerably adds to the overall expense of the compact-disk player. Such a complicated mechanism is also very subject to breakdown.

The object of the invention is accordingly to improve a disk player with a magazine for accommodating several disk-shaped recording media to the extent that the media can be removed from the magazine by means of a mechanism that is simple and little subject to breakdown.

This object is attained in accordance with the invention in that the disk-shaped recording media are thrust out of the compartment by a plunger, for which an opening is provided in the rear wall of each compartment.

Figure 3:
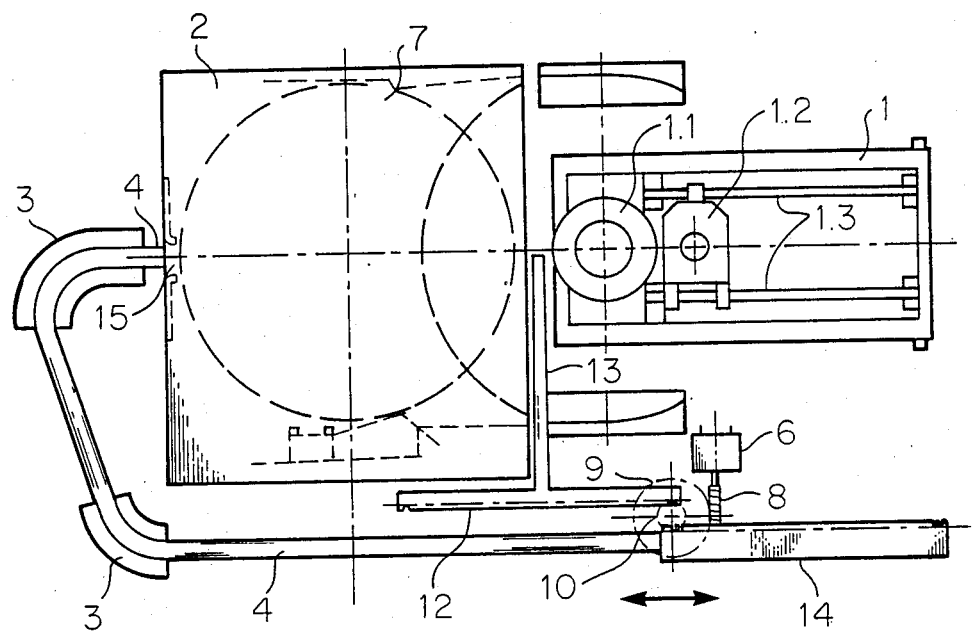
Figure 4:
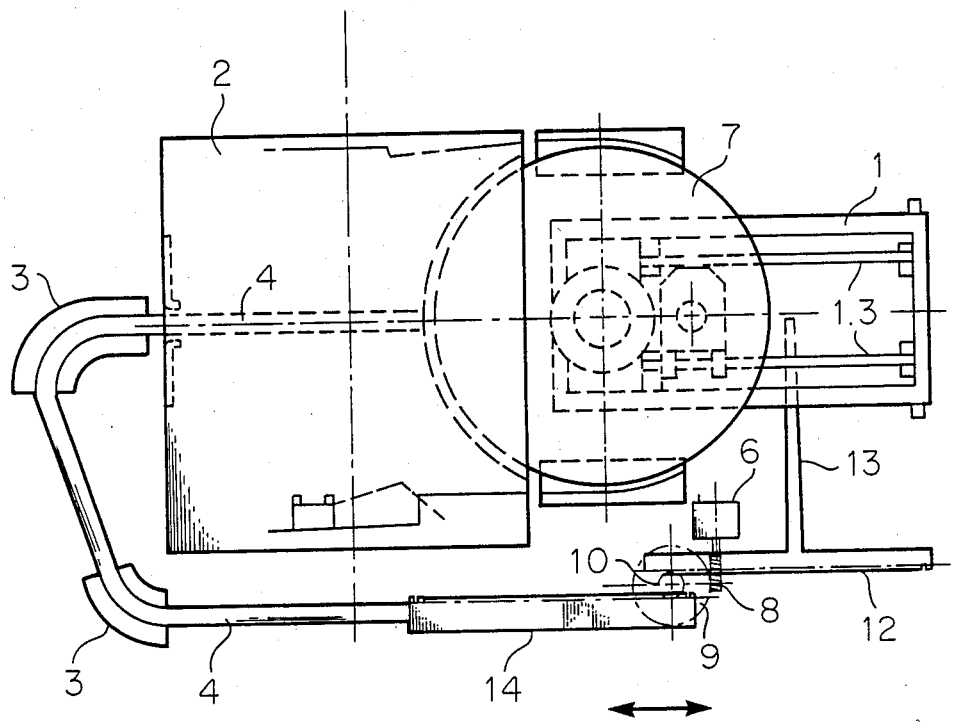
Figure 5:
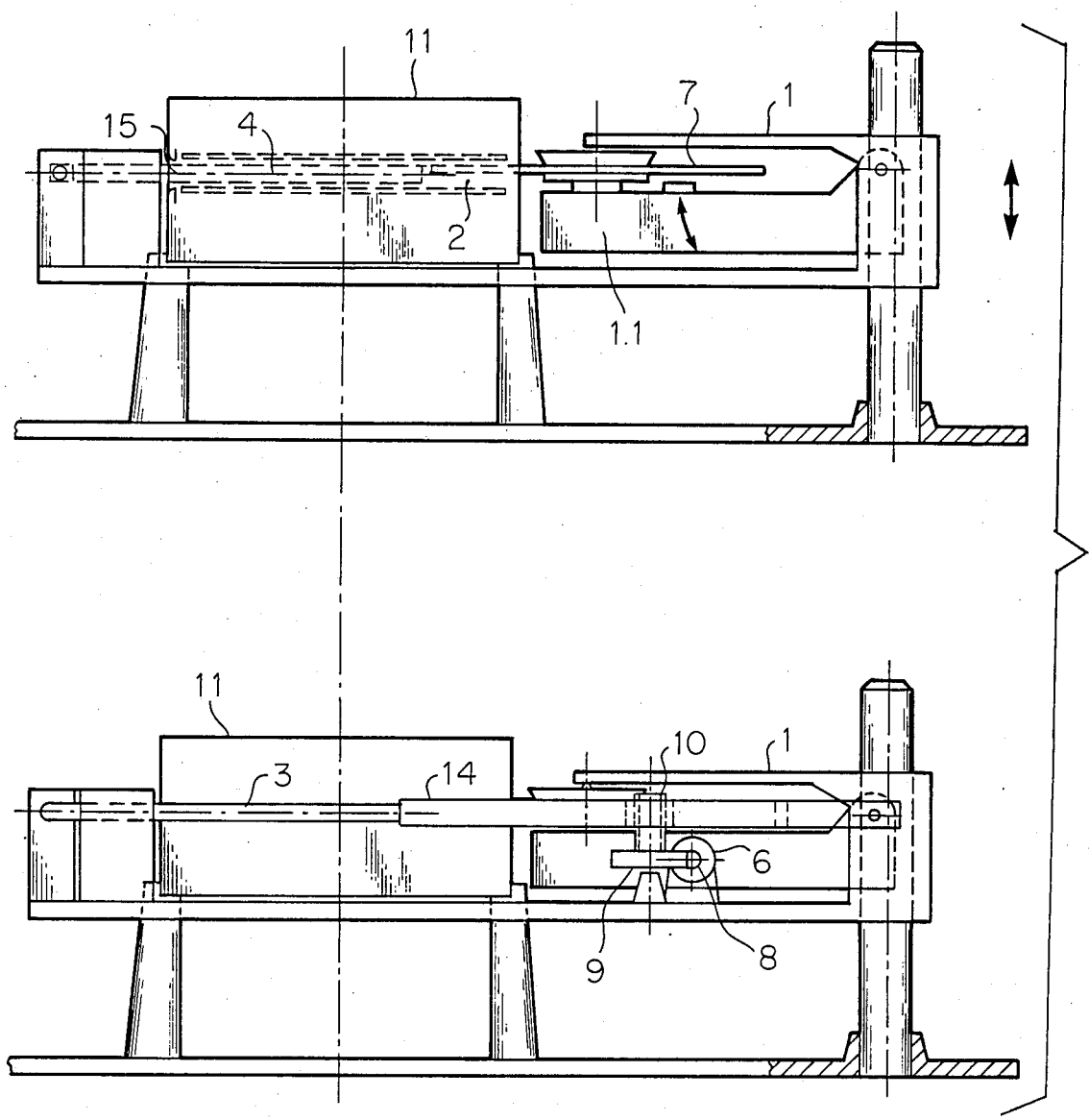

FIG. 1 is a top view of one embodiment of the invention with compact disks in its magazine, FIG. 2 is a top view of the same embodiment with a disk resting on the disk-drive mechanism, FIG. 3 is a top view of another embodiment of the invention with compact disks in its magazine, FIG. 4 is a top view of the same embodiment with a disk resting on the disk-drive mechanism, and FIG. 5 is a side view of the first embodiment.

The invention will now be described with reference to FIGS. 1 and 2.

The compact disk 7 in FIG. 1 rests in a compartment 2 in a magazine 11. At the front of magazine 11 is an operating mechanism 1 that consists of a disk-drive mechanism 1.1, an optical sensing system 1.2, and a radial sensing-system drive mechanism 1.3. Mechanically connected to operating mechanism 1, which can be shifted to the height of any compartment 2 in magazine 11, is a drive mechanism consisting of an electric motor 6, a worm gear 8, a worm wheel 9, and cogwheel 10 that is mounted on the same shaft. Mounted on the surface of cogwheel 10 that faces magazine 11 is a toothed rack 12 with a right-angled lever 13 that rests against the front of magazine 11. Mounted on the surface of cogwheel 10 that faces away from magazine 11 is another rack 14. A flexible plunger 4 is secured to the end of rack 14 that is near the rear wall of magazine 11. Flexible plunger 4 is positioned parallel to the side of magazine 11 by a tubular guide 3 and curves around the rear wall. In the center of the rear wall of magazine 11, plunger 4 curves in such a way as to point at a right angle toward the wall. In the center of the rear wall of each compartment 2 in magazine 11 and directly at the location toward which the flexible plunger points is an opening 15 that provides access to the plunger.

The flexible plunger 4 in the embodiment illustrated in FIGS. 1 and 2 is a Bowden cable similar to the cable releases employed in cameras, whereas the one in the second embodiment, illustrated in FIGS. 3 and 4, is a flexible shaft of the type employed with remote controlled toy automobiles. It is accordingly necessary in the second embodiment to employ a tubular guide 3 only at the bends. Otherwise, the second embodiment is identical to the first.

How the compact-disk player in accordance with the invention obtains disks from and returns them to the magazine will now be explained with reference to the figures.

When a compact disk 7 is selected for playing, operating mechanism 1 and, due to the mechanical connection, the mechanism that consists of racks 12 and 13, electric motor 6, worm gear 8, worm wheel 9, cogwheel 10, flexible plunger 4, and tubular guide 3 travel to the height of the compartment 2 that accommodates the particular compact disk 7 desired.

Electric motor 6 shifts, through the worm drive that consists of gear 8 and wheel 9, cogwheel 10 to the right. The right-hand rotation of cogwheel 10 shifts rack 14 to the left until flexible plunger 4 enters compartment 2 through opening 15 and thrusts compact disk 7 out of the compartment. The right-hand rotation of cogwheel 10 simultaneously shifts rack 12 and right-angled lever 13 to the right and away from the front of magazine 11 to the same extent, opening a path for compact disk 7, which can accordingly be shifted on top of and snap into disk-drive mechanism 1.1.

When a compact disk 7 has been played and is to be returned to its compartment 2, the disk is released from disk-drive mechanism 1.1 and electric motor 6 rotates cogwheel 10 to the left. The right-angled lever 13 on rack 12 accordingly slides compact disk 7 back into compartment 2 until the lever comes to rest against the front plate, while rack 14 simultaneously moves back to the same extent. This retracts flexible plunger 4 out of compartment 2 through opening 15, so that compact disk 7 encounters no resistance in entering the compartment.

The expense of the invention is very slight in comparison to the compact-disk player originally described herein. Instead of a system of levers, a pulley, and an electric motor for each compartment in the magazine, the invention employs only an opening in the rear wall of each compartment. The total mechanical expenditure of the invention is confined to two racks, a worm wheel, a worm gear, an electric motor, and a flexible plunger, a shaft for example, with a positioning tube. The mechanism, due to its simplicity, operates quietly and is also much less sensitive to breakdown than the complicated mechanism described in the aforesaid Belgian patent application.

The invention is in no way confined to compact-disk players. It is appropriate for any device wherein information is read out of a disk-shaped recording media, either through direct contact or remotely and wherein several media are stacked in a magazine. These include compact-disk players, video-disk players, and computers that employ disk-shaped recording media as a storage device. The disk player in accordance with the invention is however especially practical as a compact-disk player in that it occupies very little space and is relatively insensitive to jolting.

We claim:

1. A disk player comprising: a magazine with a plurality of superimposed compartments for receiving disk-shaped recording media; operating means, said magazine and said operating means being shiftable toward each other for removing said disk-shaped recording media from said compartments; flexible plunger means for thrusting out said disk-shaped recording media from said compartments; each compartment having a rear wall with an access opening for admitting therethrough said plunger means; said magazine having a rear wall and sides; drive means, said plunger means extending forward from said rear wall and along one side of said magazine to said drive means; said drive means forcing said plunger means into a compartment through said access opening for removing a disk-shaped recording medium from said magazine by thrusting the medium out of the compartment; said drive means being located along said side of the magazine at a substantial distance from said rear wall for reducing the amount of space required by said plunger means to thrust a medium out of a compartment.

2. A disk player as defined in claim 1, wherein said flexible plunger means and said drive means are connected to said operating means.

3. A disk player as defined in claim 1, wherein said flexible plunger means has a curved section, and a tubular guide for securing said flexible plunger means at least at said curved section.

4. A disk player as defined in claim 1, wherein said flexible plunger means enters said access opening in said rear wall of the magazine perpendicularly.

5. A disk player as defined in claim 1, wherein said access opening for said flexible plunger means is located in the center of the rear wall of each compartment.

6. A disk player as defined in claim 1, including a toothed rack at an end of said flexible plunger means which does not extend through said access opening; and a gear pinion engaging said toothed rack.

7. A disk player as defined in claim 6, including a further toothed rack with a right-angled lever parallel to the front of said magazine and engaging said pinion; a disk-shaped recording media removed from said magazine for playing being returnable to said magazine by said lever.

8. A disk player as defined in claim 7, wherein said further toothed rack with said right-angled lever is connected to said operating means.

9. A disk player as defined in claim 1, wherein said flexible plunger means comprises a Bowden cable.

10. A disk player as defined in claim 1, wherein said flexible plunger means comprises a flexible shaft.

11. A disk player as defined in claim 7, including motor means for driving said pinion; a worm wheel mounted on a shaft supporting said pinion; and a worm gear, said motor means driving said pinion through said worm gear and said worm wheel.

12. A disk player comprising: a magazine with a plurality of superimposed compartments for receiving disk-shaped recording media; operating means, said magazine and said operating means being shiftable toward each other for removing said disk-shaped recording media from said compartments; flexible plunger means for thrusting out said disk-shaped recording media from said compartments; each compartment having a rear wall with an access opening for admitting therethrough said plunger means; said magazine having a rear wall and sides; drive means, said plunger means extending forward from said rear wall and along one side of said magazine to said drive means; said drive means forcing said plunger means into a compartment through said access opening for removing a disk-shaped recording medium from said magazine by thrusting the medium out of the compartment; said drive means being located along said side of the magazine at a substantial distance from said rear wall for reducing the amount of space required by said plunger means to thrust a medium out of a compartment; a first toothed rack at an end of said flexible plunger means that does not extend through said access opening; a gear pinion engaging said first toothed rack; a second toothed rack with a right-angled lever parallel to the front of said magazine and engaging said pinion, a disk-shaped recording media removed from said magazine for playing being returnable to said magazine by said lever; said second toothed rack with said right-angled lever being connected to said operating means; said second toothed rack engaging said pinion on a side of said pinion facing said rack associated with said flexible plunger means, said plunger means and said second rack operating in conjunction with said lever so that a recording media is thrust out of a compartment by rotating said pinion in one direction and thereby forcing said plunger means through said access opening while said lever is simultaneously forced away from the front of said magazine to the same extent that a recording media is returned to its respective compartment by rotating said pinion in an opposite direction and thereby forcing said lever to thrust the recording media back into its compartment while said plunger means is simultaneously extracted out of the compartment to the same extent.

* * * * *